(12) United States Patent
Nassimi

(10) Patent No.: US 7,327,982 B2
(45) Date of Patent: Feb. 5, 2008

(54) DIRECT CONNECT WIRELESS HEADSET SYSTEM

(75) Inventor: Shary Nassimi, Malibu, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 383 days.

(21) Appl. No.: 11/160,710

(22) Filed: Jul. 6, 2005

(65) Prior Publication Data

US 2007/0010297 A1   Jan. 11, 2007

(51) Int. Cl.
*H04B 7/00* (2006.01)

(52) U.S. Cl. .................. 455/41.2; 455/90.1; 455/90.2; 455/90.3; 379/430; 379/428.02

(58) Field of Classification Search .............. 455/41.2, 455/90.1, 90.2, 90.3, 550, 568, 569; 379/430, 379/428.02
See application file for complete search history.

(56) References Cited

U.S. PATENT DOCUMENTS

| | | | | |
|---|---|---|---|---|
| 5,983,100 | A * | 11/1999 | Johansson et al. | ........ 455/426.1 |
| 2003/0100274 | A1* | 5/2003 | Brown | ......................... 455/90 |
| 2003/0152055 | A1* | 8/2003 | Aragones et al. | ........... 370/338 |
| 2006/0225188 | A1* | 10/2006 | Buskop | ......................... 2/426 |

* cited by examiner

*Primary Examiner*—Matthew Anderson
*Assistant Examiner*—Tuan Pham
(74) *Attorney, Agent, or Firm*—Fitch, Even, Tabin & Flannery

(57) ABSTRACT

The present invention is directed to a wireless communications system. The system includes a first wireless headset having a first headset body member, a first RF transceiver tuned to a predetermined RF channel, a first microphone element and a first speaker element electrically coupled to the RF transceiver, and a first battery configured to provide electrical power to the first RF transceiver, the first microphone element and the first speaker element. The first RF transceiver and the first battery being disposed in the first headset body member. At least one second wireless headset includes a second headset body member, a second RF transceiver, a second microphone element and a second speaker element electrically coupled to the second RF transceiver, and a second battery configured to provide electrical power to the second RF transceiver, the second microphone element and the second speaker element. The second RF transceiver and the second battery are disposed in the second headset body member. The second RF transceiver is tuned to the predetermined RF channel such that the first wireless headset and the at least one second headset are directly connected by a single channel wireless network comprising a coverage range that is a function of a battery capacity of the first battery and/or second battery.

20 Claims, 4 Drawing Sheets

DIRECT CONNECT WIRELESS HEADSET SYSTEM

BACKGROUND OF THE INVENTION

1. Field of the Invention

The present invention relates generally to wireless communications, and particularly to a direct-connect wireless headset system.

2. Technical Background

The use of wireless communications has increased dramatically in the past several years. The demand for wireless products and services is expected to remain strong in the future. In fact, the need to have instantaneous communications available, no matter where the location, is rapidly becoming a necessity. Accordingly, wireless communications devices continue to proliferate in both the home, automotive and business environments. There is also a need for wireless communications for group recreational activities.

Activities such as biking, jogging, hiking, and off-road vehicular activities (i.e., "four-wheeling," motorized ski-sleds, etc.), to name a few, are often done in groups. When a group of individuals are engaging in such activities, it is inevitable that group members attempt to communicate with each other for a variety of reasons. There may be safety issues. Group members may desire to discuss route options. Group members may simply enjoy an on-going conversation. In many of the activities listed above, communications between group members may be difficult, if not impossible, without the use of communications equipment.

One approach that may be considered in meeting this need is wireless telephony. However, wireless telephony has drawbacks. Often times, the activity may be in an area that is not covered by wireless service. In addition, wireless telephony only allows two members of the group to communicate at a time. Other group members may feel left out. Finally, telephony may not be practical during such activities. No one wants to place a call to a group member that is jogging a few meters away. Instead, the activity usually comes to a momentary halt while group members exchange comments.

Walkie-talkies are another approach that may be considered to meet this need. However, these devices also have their drawbacks. While portable radio-telephones are configured to provide communications between individuals in the field, they are not suitable for the activities described above. These devices are relatively bulky and heavy. The battery and radio equipment is separate from the handset and must be lugged around by the user. Even when such equipment is light weight, it typically requires that the radio and battery be carried on a belt around the person's waist and tethered to a headset.

What is needed is a lightweight, low power, wireless headset communications system that directly connects two or more wireless headsets together to provide instantaneous communications between members of a group disposed in a predetermined coverage area.

SUMMARY OF THE INVENTION

The present invention addresses the needs described above. The present invention is directed to a lightweight, low power, wireless headset communications system that directly connects two or more wireless headsets together to provide instantaneous communications between members of a group disposed in a predetermined coverage area.

One aspect of the present invention is a wireless communications system. The system includes a first wireless headset having a first headset body member, a first RF transceiver tuned to a predetermined RF channel, a first microphone element and a first speaker element electrically coupled to the RF transceiver, and a first battery configured to provide electrical power to the first RF transceiver, the first microphone element and the first speaker element. The first RF transceiver and the first battery being disposed in the first headset body member. At least one second wireless headset includes a second headset body member, a second RF transceiver, a second microphone element and a second speaker element electrically coupled to the second RF transceiver, and a second battery configured to provide electrical power to the second RF transceiver, the second microphone element and the second speaker element. The second RF transceiver and the second battery are disposed in the second headset body member. The second RF transceiver is tuned to the predetermined RF channel such that the first wireless headset and the at least one second headset are directly connected by a single channel wireless network comprising a coverage range that is a function of a battery capacity of the first battery and/or second battery.

In another aspect, the present invention is directed to a wireless communications system. The system includes a first wireless headset having a first headset body member, a first RF transceiver tuned to a predetermined RF channel, a first microphone element and a first speaker element electrically coupled to the RF transceiver, and a first battery configured to provide electrical power to the first RF transceiver, the first microphone element and the first speaker element. The first RF transceiver and the first battery being disposed in the first headset body member. At least one second wireless headset includes a second headset body member, a second RF transceiver, a second microphone element and a second speaker element electrically coupled to the second RF transceiver, and a second battery configured to provide electrical power to the second RF transceiver, the second microphone element and the second speaker element. The second RF transceiver and the second battery are disposed in the second headset body member. The second RF transceiver is tuned to the predetermined RF channel such that the first wireless headset and the at least one second headset are directly connected by a single channel wireless network comprising a coverage range that is a function of a battery capacity of the first battery and/or second battery. At least one RF repeater includes a housing, an antenna, a repeater transceiver coupled to the antenna, and repeater battery coupled to the repeater transceiver. The repeater transceiver and the repeater battery are disposed in the housing. The RF repeater transceiver is tuned to the predetermined RF channel to thereby receive transmissions from the first wireless headset and/or the at least one second wireless headset and retransmit the transmissions. The repeater retransmissions have a second range greater than or equal to the first predetermined range.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
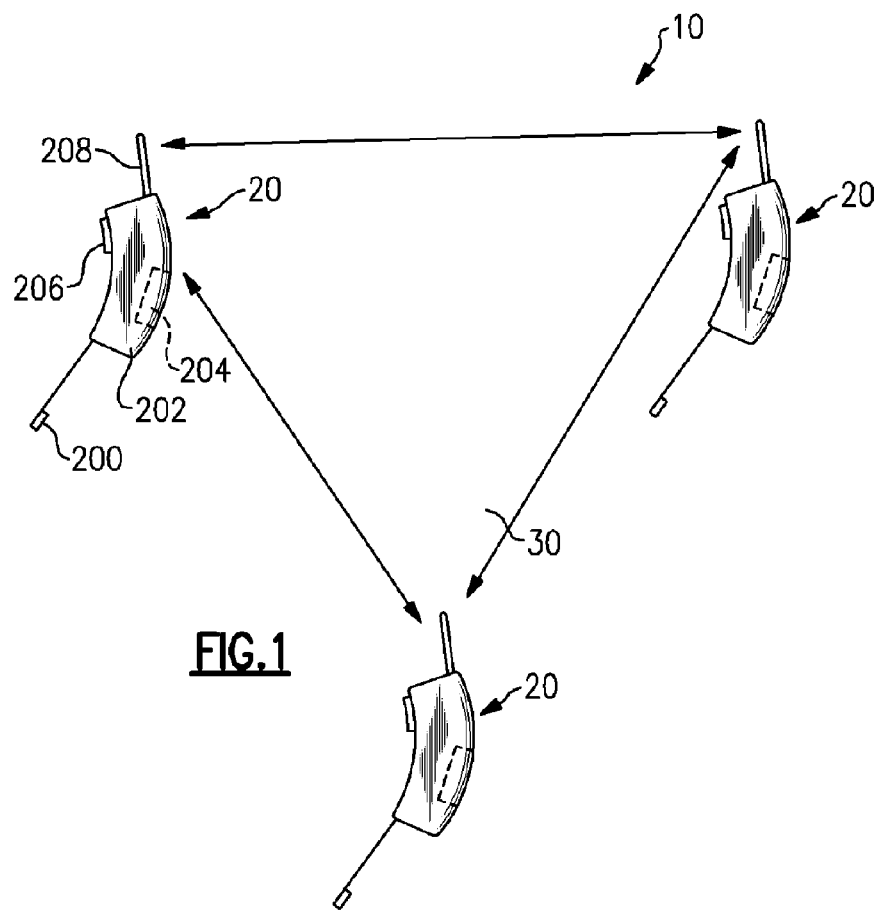
FIG. 1 is a diagram illustrating the wireless communications system in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the communications system of the present invention is shown in FIG. 1, and is designated generally throughout by reference numeral 10.

As embodied herein, and depicted in FIG. 1, a diagram illustrating the wireless communications system in accordance with the present invention is disclosed. Wireless system 10 includes two or more wireless headsets 20 tuned to a predetermined RF channel such that the headsets 20 may be in direct communication with each other via a single predetermined RF channel. Wireless network 10 has a coverage range 30 that is a function of the headset battery capacities and the frequency of the RF channel. More information regarding the coverage range is provided in the discussion of the RF transceiver.

The wireless headset is shown having a microphone 200, a headset body 202, a battery 204, an earpiece 206, and an antenna 208. Of course, each headset includes an RF transceiver tuned to the RF channel. The headsets may provide the users with a single fixed frequency or a selection of available frequencies. By having a selection of frequencies, various sub-groups may communicate separately. As shown, the RF transceiver and the battery 204 are disposed in the headset body 202. Depending on the design of the body 202, microphone 200 and earpiece 206 may also be disposed in body 202.

In one embodiment, the earpiece 206 may be configured to be inserted into the auditory canal of the user. In another embodiment, the headset body 202 may be of a shape that wraps around the ear, such that the earpiece 206 is disposed proximate the auditory canal of the ear. Finally, the earpiece 206 may be configured to fit over the user's ear.

Figure 2:
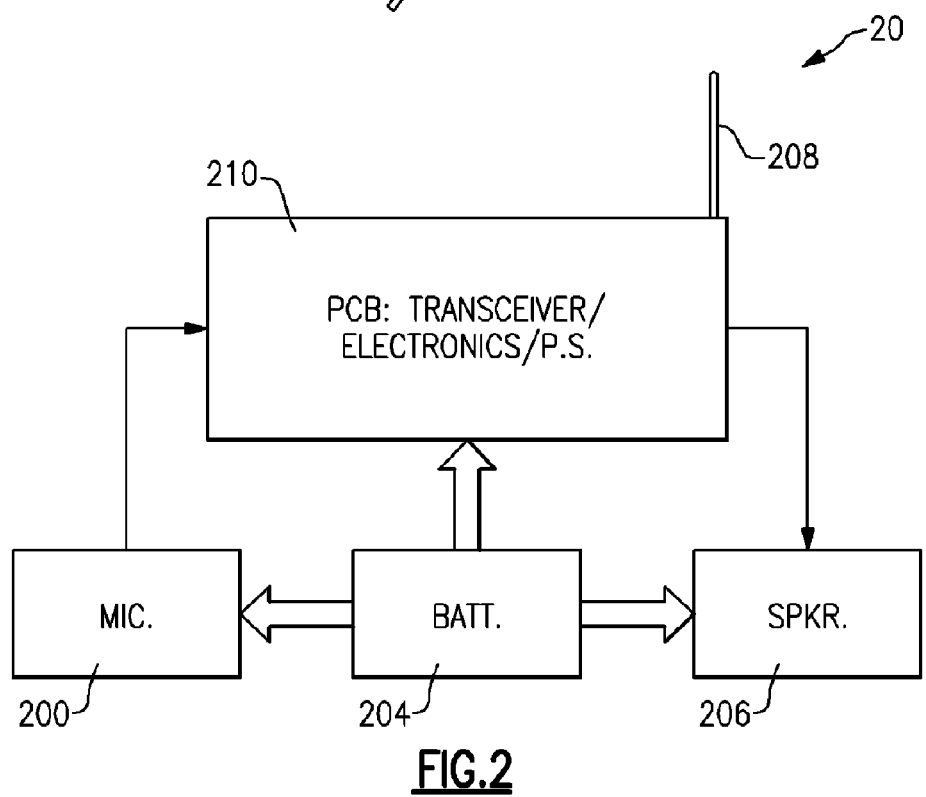
FIG. 2 is a block diagram of a wireless headset in accordance with an embodiment of the present invention.

Referring to FIG. 2, a block diagram of a wireless headset 20 in accordance with an embodiment of the present invention is disclosed. Headset 20 includes a microphone 200 coupled to RF transceiver assembly 210. The RF transceiver assembly is typically disposed on a printed circuit board disposed in housing 202. Microphone 200 is configured to convert sound waves into electrical impulses as is commonly known in the art. RF transceiver 210 is coupled to speaker 206. Of course, speaker 206 is impedance-matched to the transceiver 210 and is configured to convert electrical impulses into sound waves. A battery 204 is disposed within housing 202 and is configured to provide power to each of the elements in FIG. 2. Those skilled in the art will understand that battery 204 must interface with a power supply configured to convert battery power into voltages required by the individual components. The power supply may be part of the battery assembly, or alternatively, the power supply may implemented as part of assembly 210.

Modifications and variations may be made to the RF transceiver depending on the type of modulation used, the center frequency of the RF channel(s), and the intended coverage range of system 10. For example, RF transceiver 210 may employ frequency modulation (FM), amplitude modulation (AM), single-sideband AM, or other types of modulation techniques. However, because of the weight and size requirements of the headset 20, a modulation technique that may be implemented using simple circuitry may be preferable.

Those of ordinary skill in the pertinent art will also recognize that the RF signal may be broadcast at any suitable frequency open for public use and may be generally selected within a range between 30 MHz-900 MHz. Alternatively, headset 20 may operate in the industrial, scientific, and medical (ISM) frequency band to avoid interference with other communications equipment. The ISM band accommodates channels in the 2.4 GHz range, as well as 900 MHz. Of course, the RF channel frequency will impact the range of the broadcast signal. With all things being equal, the range is typically inversely proportional to the frequency. With that in mind, the power of the RF transmit signal, and the sensitivity of the RF receiver, determines the radius of coverage area 30. The power of the RF signal is a function of the battery capacity. On the other hand, a lightweight battery must be employed to limit the weight and size of headset 20. Accordingly, the radius of coverage area may be 10-30 meters or less.

Those of ordinary skill in the art will also recognize that battery 204 may be of any suitable type depending on the size and weight of headset 20. For example, battery 204 may be implemented using nickel-cadmium (NiCd) batteries. Battery 204 may be rechargeable using an AC wall charger. Alternatively, nickel-metal hydride (NiMH), lithium-ion, or lithium polymer (Li-Pol) batteries may also be employed.

Figure 3:
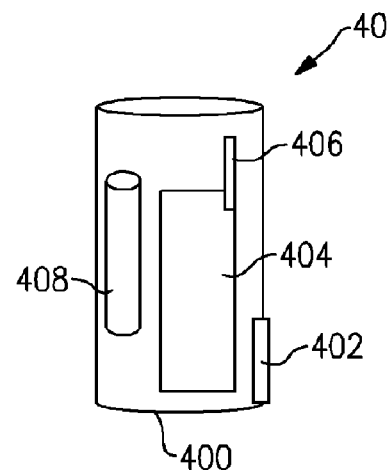
FIG. 3 is a block diagram of a wireless repeater in accordance with the present invention.

Referring to FIG. 3, a block diagram of a wireless repeater 40 in accordance with the present invention is disclosed. As noted above, the coverage range of wireless headset system 10 may be on the order of several, or tens of, meters. This may be too limiting for certain applications. To overcome this issue, the present invention may be employed with repeater 40.

Repeater 40 includes a printed circuit board 404 and a battery 408 disposed within housing 400. Mounting device 402 is connected to housing 400. Printed circuit board 404 includes an RF repeater transceiver disposed thereon. The repeater transceiver is connected to antenna 406. The repeater battery 408 provides power to the printed circuit board 404 and the repeater transceiver. Like the headsets 20 in wireless network 10, the RF repeater transceiver is tuned to the pre-selected RF channel. The repeater device 40 is configured to receive and retransmit headset 20 transmissions to increase the effective range of system 10.

The mounting device 402 allows repeater 40 to be attached to an off-road vehicle, or attached to a fixed position on the ground. Because repeater 40 may be disposed at a stationary position, the size and weight of repeater 40 is not as much a factor in the design of the battery 408 and repeater transceiver. There may be other limitations as well. There may be power limits for unlicensed operations in certain frequency bands. Some unlicensed operations are limited to 0.5 mW.

Figure 4:
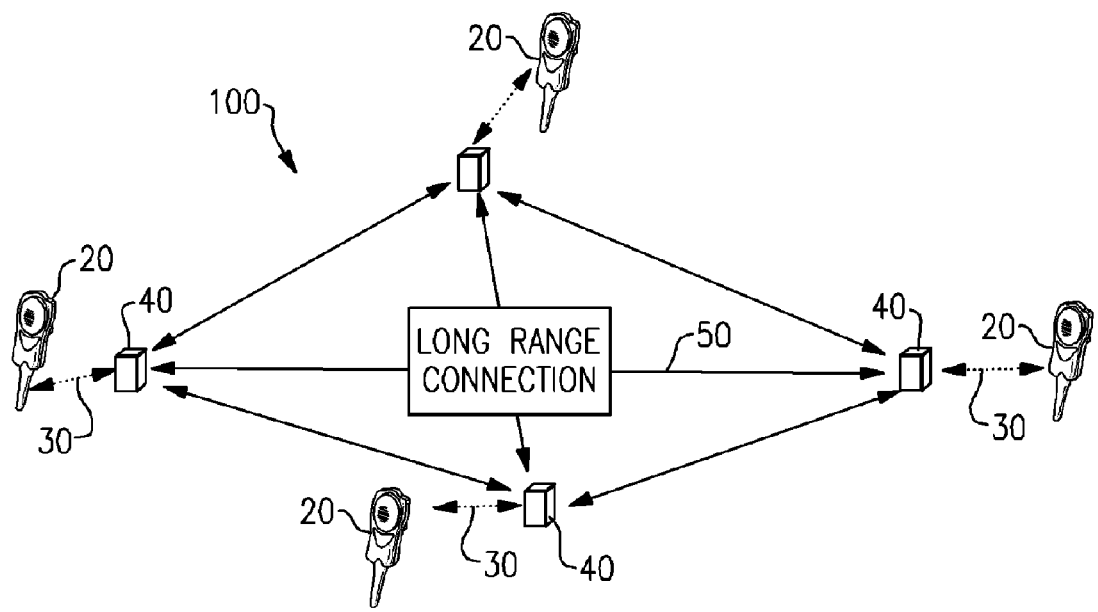
FIG. 4 is a diagram illustrating the wireless communications system using the repeater shown in FIG. 3.

FIG. 4 is a diagram illustrating the wireless communications system using the repeater shown in FIG. 3. System 100 includes several headsets 20, each of which is coupled to a repeater 40 disposed within coverage range 30. Because the repeaters 40 may be equipped with more powerful RF transmitters, coverage range 50 may be greater as well.

Figure 5:
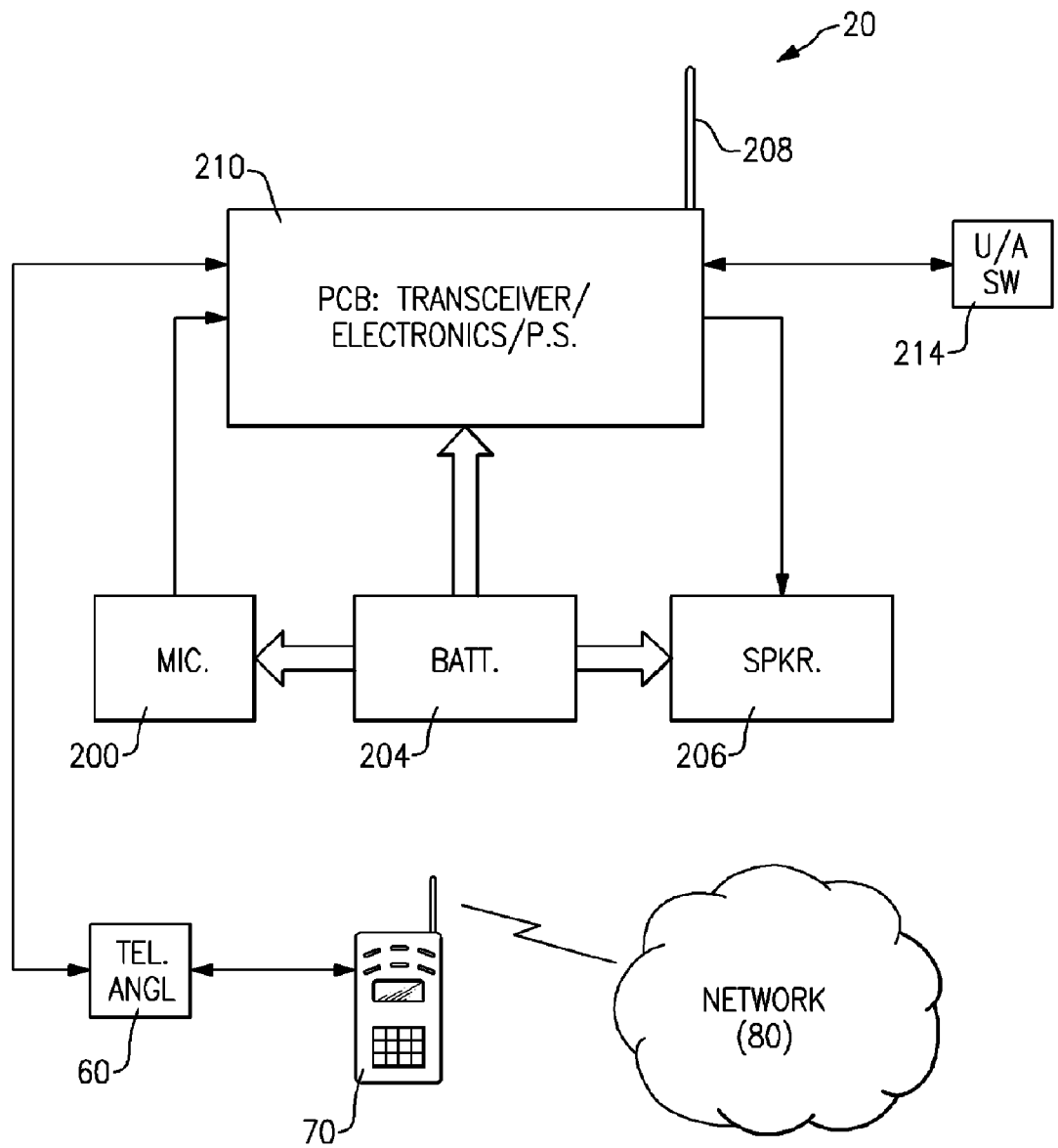
FIG. 5 is a block diagram of a wireless headset in accordance with another embodiment of the present invention.

As embodied herein and depicted in FIG. 5, a block diagram of a wireless headset 20 in accordance with another embodiment of the present invention is disclosed. This embodiment includes all of the elements of the embodiment disclosed in FIG. 2. For example, headset 20 includes a microphone 200 coupled to RF transceiver assembly 210. RF transceiver 210 is coupled to speaker 206. Of course, speaker 206 is matched to the transceiver 210 and is thus configured to convert electrical impulses into sound waves. Battery 204 is disposed within housing 202 and is configured to provide power to each of the elements in FIG. 2. Again, those skilled in the art will understand that battery 204 must interface with a power supply configured to convert battery power into voltages required by the individual components. The RF transceiver 210 also includes a bidirectional connection 212 that is configured to mate with a telephony dongle 60. Telephony dongle 60 is configured to couple wireless headset 20 to wireless telephone 70. A user accessible switch 214 may also be coupled to transceiver 210.

Switch 214 allows a user to toggle between headset-to-headset communications via the RF channel, and telephonic communications via the telephone device 70. In response to a signal received by switch 214, the transceiver may be directed to process signals on the telephony port (i.e., from 212) instead of the headset-to-headset signals normally processed. Those of ordinary skill in the art will understand that user accessible switch 214 may be incorporated into connection element 212. In this embodiment there would only be a single wireline connection between headset 20 and the telephony device 70.

Those of ordinary skill in the art will recognize that telephony dongle 60 may be implemented using any suitable means. For example, dongle 60 may be implemented as a discrete adapter device that includes, for example, a male connector configured to mate to an input port of the telephone 70, and an additional connector configured to accommodate connection wire 212. On the other hand, the present invention also contemplates that dongle 60 may be implemented within telephone 70 itself. In either case, dongle 60 performs any signal conditioning that may need to occur between transceiver assembly 210 and the telephone 70.

Figure 6:
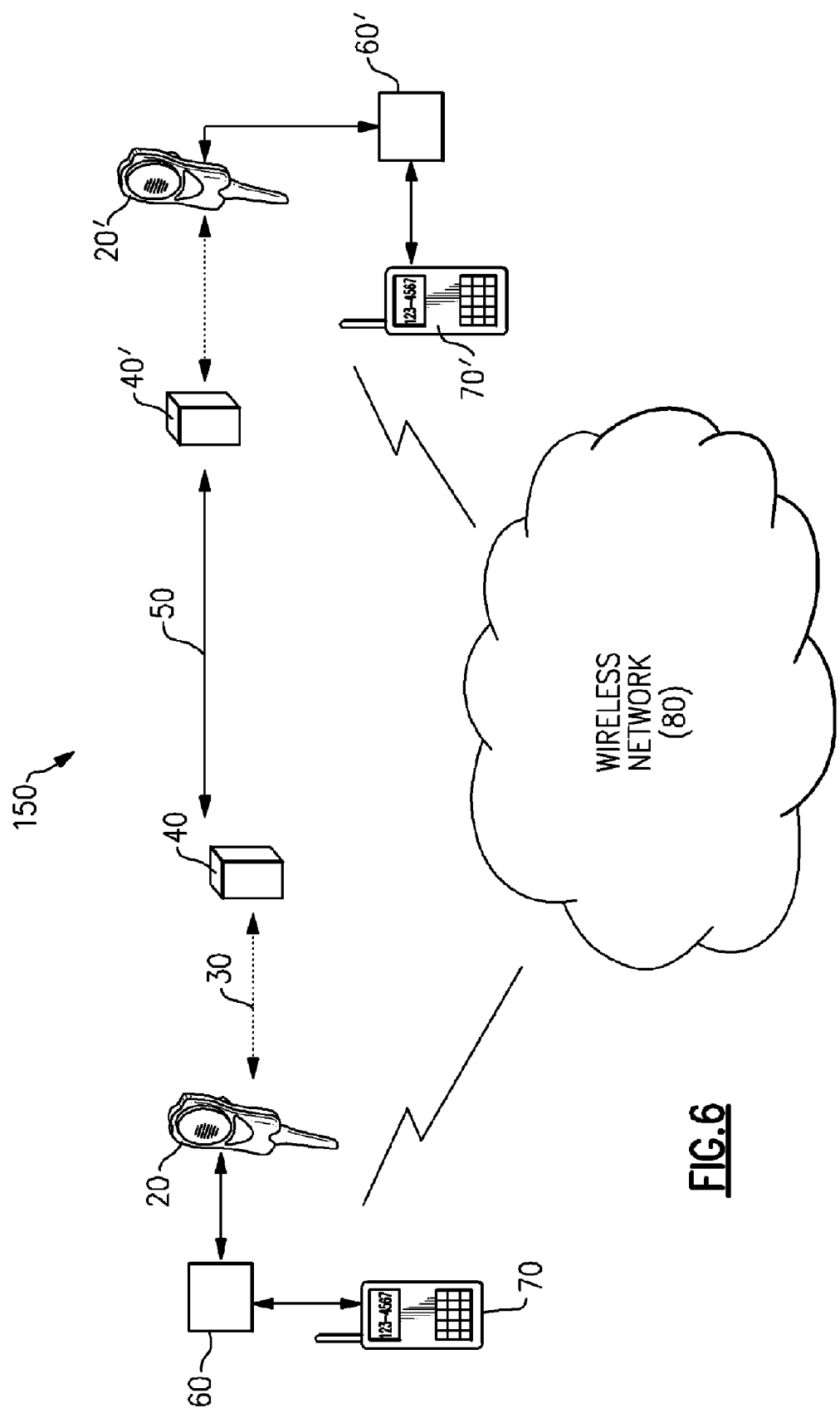
FIG. 6 is a diagram illustrating the wireless communications system using the telephony dongle shown in FIG. 5 and the repeater shown in FIG. 3.

Referring to FIG. 6, a diagram illustrating the wireless communications system 150 using telephony dongle 60 and repeater 40 is disclosed. System 150 includes headset 20 and headset 20'. Headset 20 and headset 20' are directly connected by way of the predetermined RF channel established between headset 20 and repeater 40, repeater 40 and repeater 40', and repeater 40' and headset 20'. As described above, the user operating headset 20 may switch to telephonic communications using telephone 70. This allows the user to communicate with parties accessible via network 80.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A wireless communications system comprising:
a first wireless headset including a first headset body member, a first RF transceiver tuned to a predetermined RF channel, a first microphone element and a first speaker element electrically coupled to the RF transceiver, and a first battery configured to provide electrical power to the first RF transceiver, the first microphone element and the first speaker element, the first RF transceiver and the first battery being disposed in the first headset body member; and
at least one second wireless headset including a second headset body member, a second RF transceiver, a second microphone element and a second speaker element electrically coupled to the second RF transceiver, and a second battery configured to provide electrical power to the second RF transceiver, the second microphone element and the second speaker element, the second RF transceiver and the second battery being disposed in the second headset body member, the second RF transceiver being tuned to the predetermined RF channel such that the first wireless headset and the at least one second headset are directly connected by a single channel wireless network comprising a coverage area that is a function of a battery capacity of the first battery and/or second battery.

2. The system of claim 1, wherein the at least one second wireless headset includes a plurality of second wireless headsets.

3. The system of claim 1, wherein the first battery and/or the second battery are rechargeable batteries.

4. The system of claim 1, wherein the first microphone and/or the second microphone are disposed within the first headset body member and the second headset body member, respectively.

5. The system of claim 1, wherein the first speaker is disposed in a first ear piece configured to be inserted into the auditory canal of a human ear, and wherein the second speaker is disposed in a second ear piece configured to be inserted into the auditory canal of a human ear.

6. The system of claim 1, wherein the first speaker is disposed in a first ear piece configured to be disposed in a position proximate to the auditory canal of a human ear, and wherein the second speaker is disposed in a second ear piece configured to be disposed in a position proximate to the auditory canal of a human ear.

7. The system of claim 1, wherein the first speaker is disposed in a first ear piece configured to be disposed in a position over the auditory canal of a human ear, and wherein the second speaker is disposed in a second ear piece configured to be disposed in a position over the auditory canal of a human ear.

8. The system of claim 1, wherein the first speaker and/or the second speaker are disposed within the first headset body member and the second headset body member, respectively.

9. The system of claim 1, further comprising a telephony dongle configured to couple the first wireless headset and/or the at least one second wireless headset to a wireless telephony device.

10. The device of claim 9, further comprising a switching device disposed in the first wireless headset and/or the at least one second wireless headset, the switching device being configured to switch between the predetermined RF channel and telephonic communications via the wireless telephony device.

11. The system of claim 9, wherein the telephony dongle couples the wireless headset to the telephony device via a wireline connection.

12. The system of claim 9, wherein the telephony dongle couples the wireless headset to the telephony device via a wireless connection.

13. The system of claim 1, further comprising at least one RF repeater including a housing, an antenna, a repeater transceiver coupled to the antenna, and repeater battery coupled to the repeater transceiver, the repeater transceiver and the repeater battery being disposed in the housing, the RF repeater transceiver being tuned to the predetermined RF channel to thereby receive transmissions from the first wireless headset and/or the at least one second wireless headset and retransmit the transmissions, the repeater retransmissions having a second range greater than or equal to the first predetermined range.

14. The system of claim 13, wherein the repeater battery includes a rechargeable battery.

15. The system of claim 13, wherein the at least one repeater device includes a plurality of repeater devices.

16. The system of claim 13, wherein the second range is a function of a battery capacity of the repeater battery.

17. The system of claim 1, wherein the first wireless headset and the at least one second wireless headset include a push-to-talk mechanism.

18. The system of claim 1, wherein the first wireless headset and the at least one second wireless headset are voice activated.

19. The system of claim 18, wherein the first wireless headset and the at least one second wireless headset are configured to include a power saving mode, the power saving mode being entered after a predetermined period of time has elapsed from a voice activation, the first wireless headset and the at least one second wireless headset being reactivated from the power saving mode by way of a user-actuated mechanism.

20. A wireless communications system comprising:

a first wireless headset including a first headset body member, a first RF transceiver tuned to a predetermined RF channel, a first microphone element and a first speaker element electrically coupled to the RF transceiver, and a first battery configured to provide electrical power to the first RF transceiver, the first microphone element and the first speaker element, the first RF transceiver and the first battery being disposed in the first headset body member;

at least one second wireless headset including a second headset body member, a second RF transceiver, a second microphone element and a second speaker element electrically coupled to the second RF transceiver, and a second battery configured to provide electrical power to the second RF transceiver, the second microphone element and the second speaker element, the second RF transceiver and the second battery being disposed in the second headset body member, the second RF transceiver being tuned to the predetermined RF channel such that the first wireless headset and the at least one second headset are directly connected by a single channel wireless network comprising a coverage range that is a function of a battery capacity of the first battery and/or second battery; and at least one RF repeater including a housing, an antenna, a repeater transceiver coupled to the antenna, and repeater battery coupled to the repeater transceiver, the repeater transceiver and the repeater battery being disposed in the housing, the RF repeater transceiver being tuned to the predetermined RF channel to thereby receive transmissions from the first wireless headset and/or the at least one second wireless headset and retransmit the transmissions, the repeater retransmissions having a second range greater than or equal to the first predetermined range.

* * * * *